United States Patent [19]

Parshall

[11] Patent Number: 4,514,301
[45] Date of Patent: Apr. 30, 1985

[54] CONTINUOUS MEDIA FILTER

[75] Inventor: David G. Parshall, Northville, Mich.

[73] Assignee: AMSTED Industries Incorporated, Chicago, Ill.

[21] Appl. No.: 295,651

[22] Filed: Aug. 24, 1981

[51] Int. Cl.³ .......................................... B01D 33/02
[52] U.S. Cl. .................................. 210/400; 210/416.1; 210/DIG. 3
[58] Field of Search ............... 198/833, 849; 210/387, 210/391, 400, 401, 406, 411, 416.1, 526, DIG. 3

[56] References Cited

U.S. PATENT DOCUMENTS

| | | | |
|---|---|---|---|
| 1,017,222 | 2/1912 | Livingston | 210/401 X |
| 1,403,369 | 1/1922 | Anderson | 210/400 X |
| 2,609,085 | 9/1952 | Terhune | 198/833 X |
| 2,885,080 | 5/1959 | Goldman | 210/400 X |
| 3,087,620 | 4/1963 | Hirs | 210/401 X |
| 3,485,379 | 12/1969 | Hutson | 210/400 |
| 3,807,559 | 4/1974 | Horn | 210/401 X |
| 4,137,169 | 1/1979 | El-Hindi | 210/400 X |
| 4,172,035 | 10/1979 | Adams | 210/400 X |
| 4,192,747 | 3/1980 | Wykoff | 210/526 X |
| 4,221,390 | 9/1980 | Bainbridge | 210/400 X |

Primary Examiner—Robert Spitzer
Attorney, Agent, or Firm—Charles E. Bouton

[57] ABSTRACT

A filter apparatus for removing suspended matter from a suspension including a tank for receiving the contaminated liquid and a filtrate chamber. A perforate wall of the filtrate supports an endless and reusable filter media. The filter media is in the form of a closed loop having a run of the loop located outside and below the tank for the convenience of removing suspended solid collected on the media. The media is displaced along the length of the perforate wall to provide a solids free filter area by a movable conveyor. The conveyor serves to displace the media and hold the marginal edges in sealing engagement with edges of the perforate plate to prevent the contaminated liquid from bypassing the filter area.

2 Claims, 12 Drawing Figures

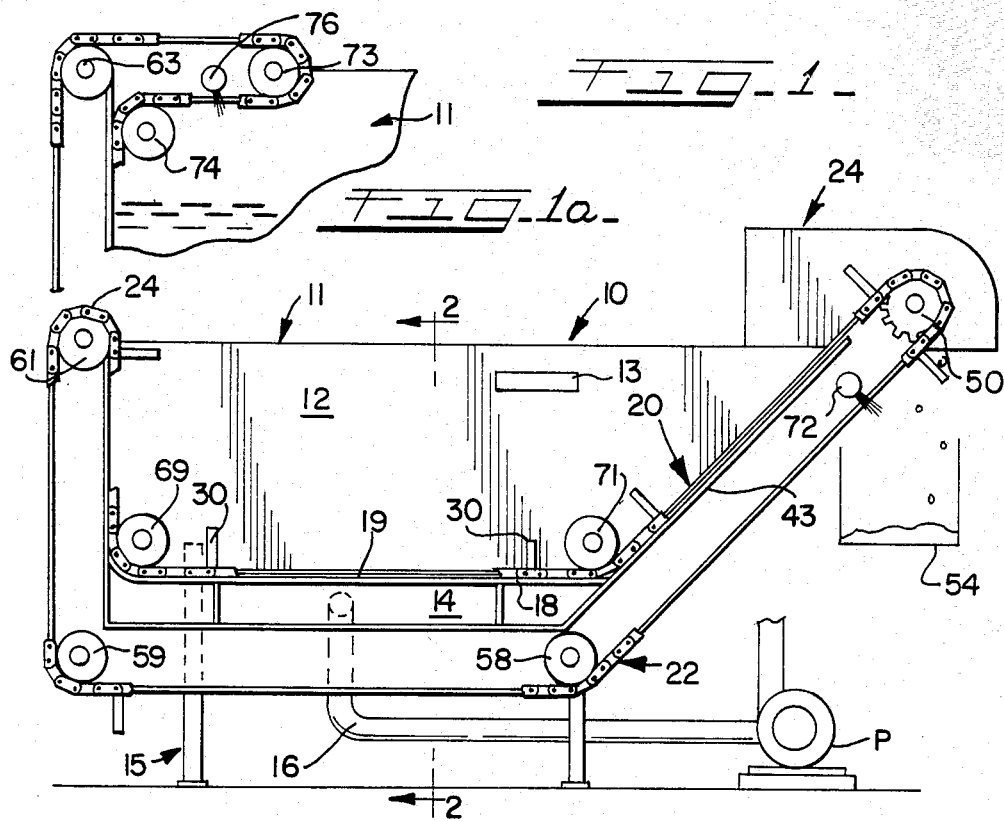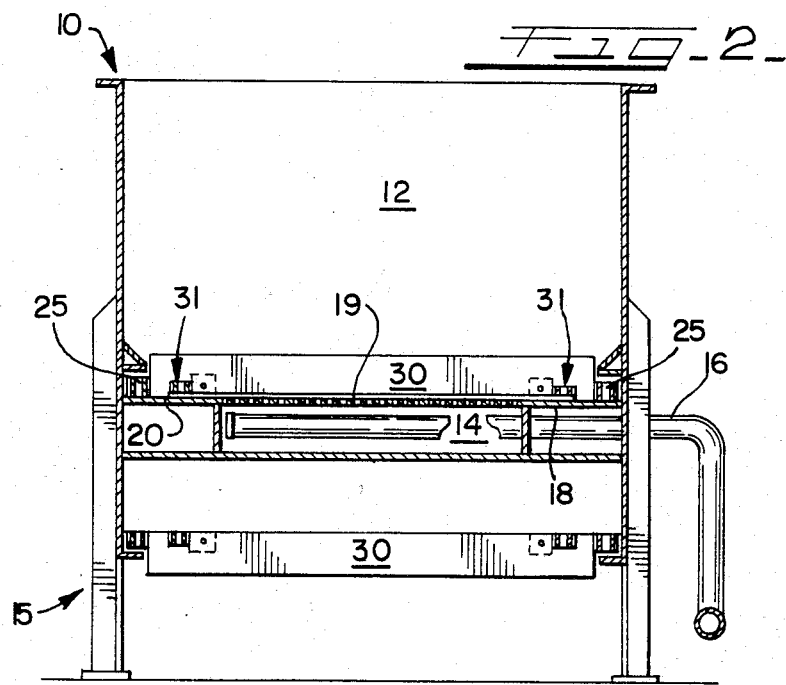

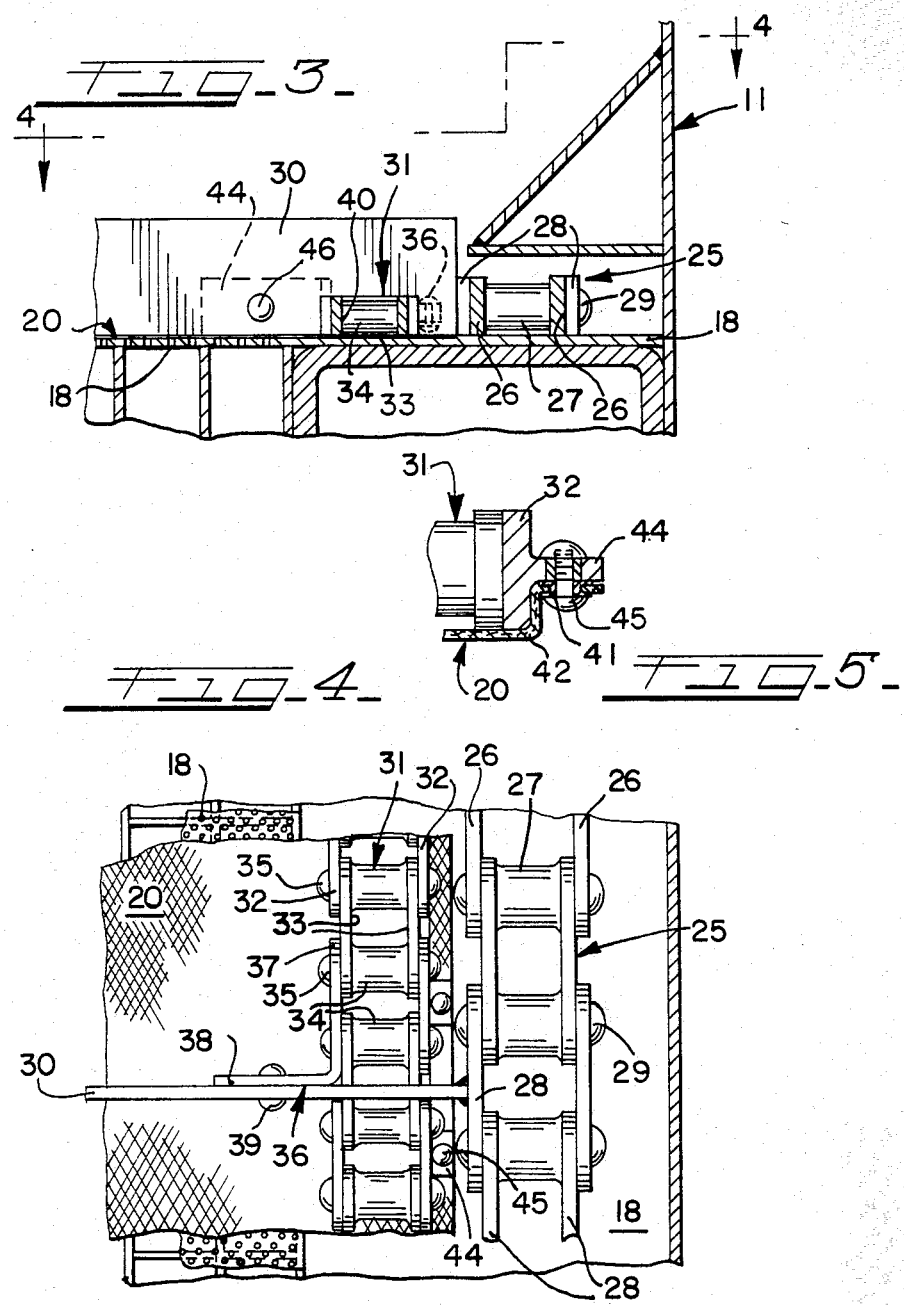

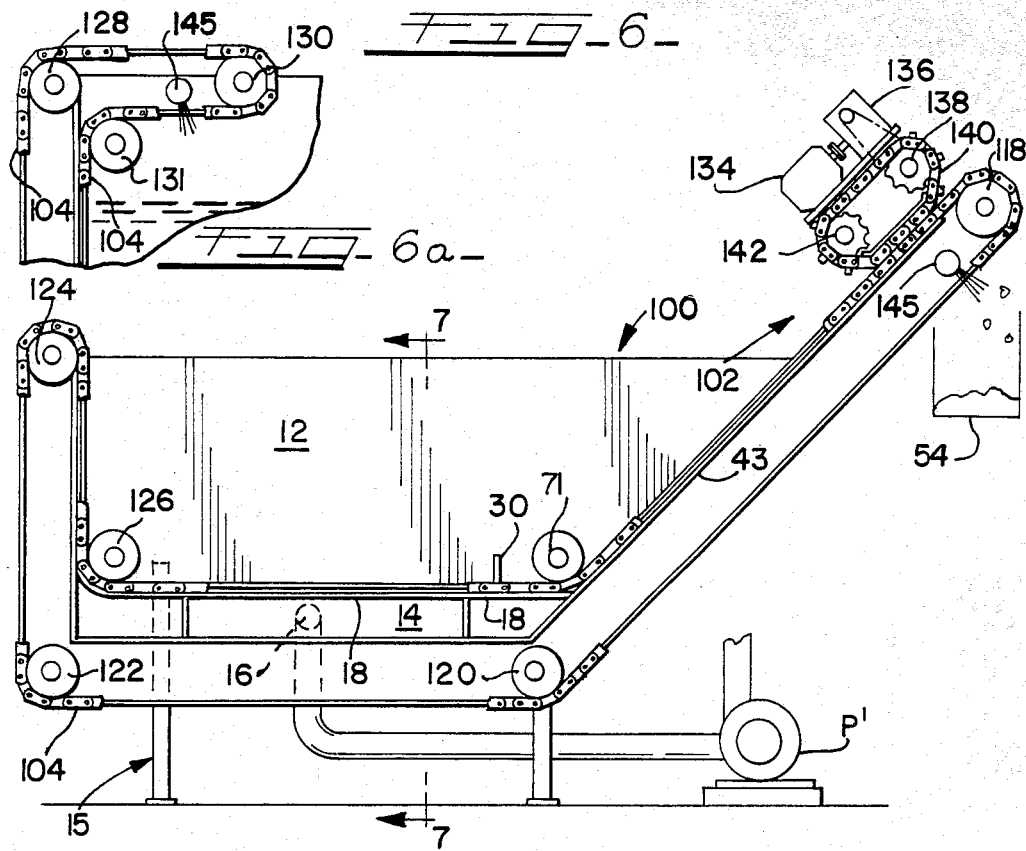
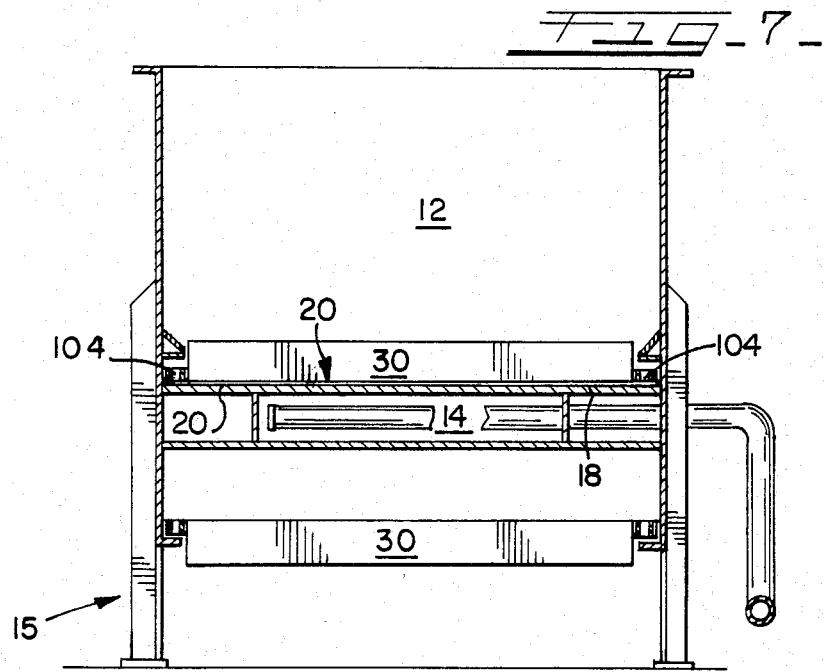

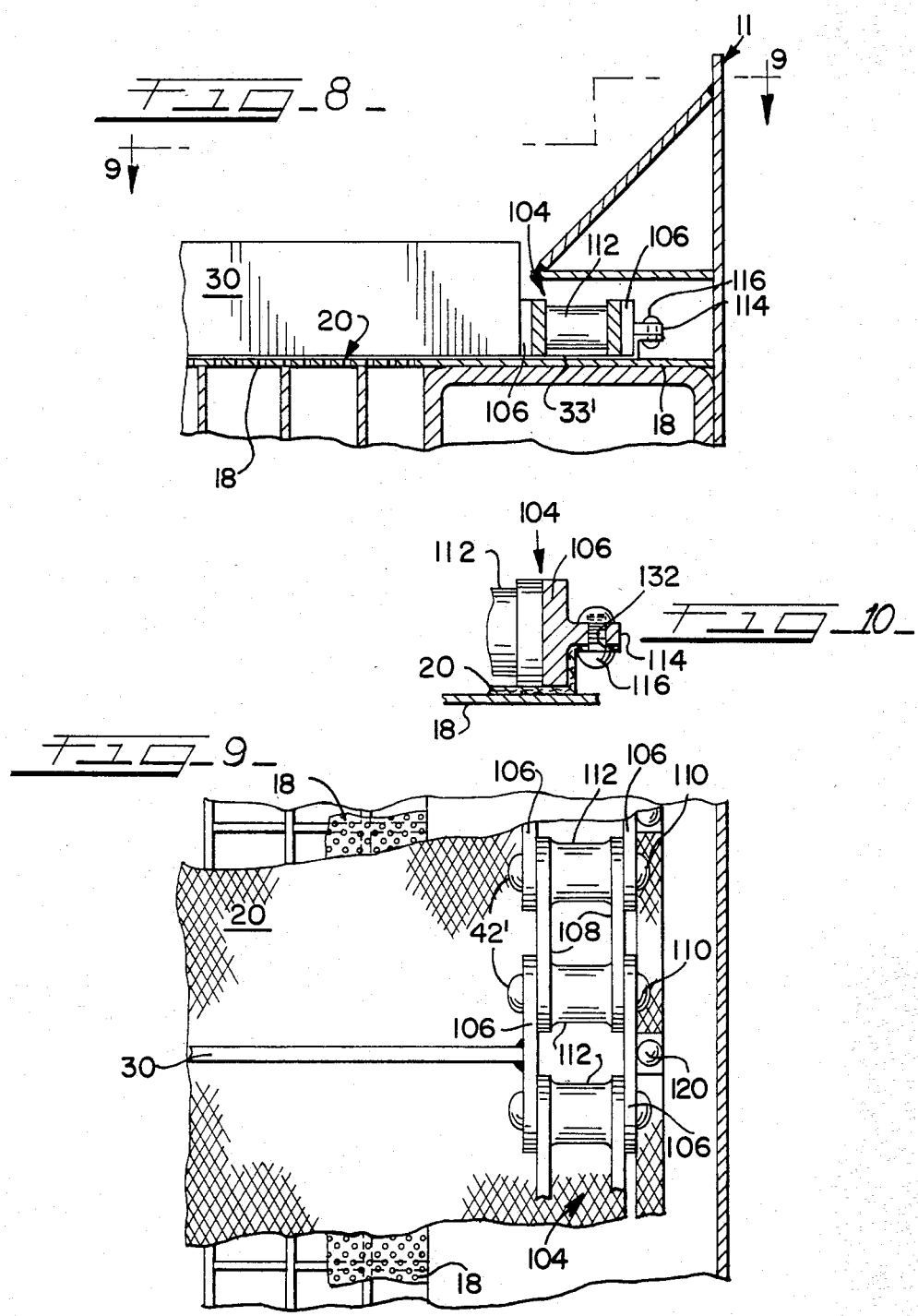

CONTINUOUS MEDIA FILTER

FIELD OF THE INVENTION

The present invention relates to filtering apparatus for filtering suspended solids from a suspension and more particularly to filtering apparatus having an improved filter media and media displacement arrangement.

PRIOR ART

The filtration apparatus of the present invention is intended for use in the treatment of liquid suspensions such as liquid coolants used in industrial machining operations and the like. The suspended solid maybe fine metal particles which are separated from the coolant liquid by a filter media and the filtrate or clarified coolant is then returned for reuse in the machining function.

The filter apparatus to which the present invention relates includes a tank having a filtrate box adjacent the base thereof. The filtrate box includes a perforate wall through which liquid in the tank is adapted to flow. A sheet of filter media is supported over the perforate wall to separate the suspended solids from the liquid. The clean liquid is then recycled to the machining operation.

Heretofore, the woven filter media has been in the form of a length of material withdrawn from a roll and the withdrawn length disposed of after use. The filter media has also been in the form of closed loop so as to be capable of repeated use. The filter media is operative to periodically travel across the perforate wall of the filtrate chamber to maintain an efficient rate after an excessive build-up of suspended solids on the filter media. Such travel of the filter media is achieved by a conveyor means having flights extending across the width of the media. The conveyor means generally comprises chains that are operative to move the media a predetermined distance across the perforate wall to provide an area that is free of suspended solids so as to increase the flow rate into the filtrate chamber.

Filter apparatus of this general type is shown in U.S. Pat. No. 3,087,620. This patent discloses a filter media which is disposable after use. A filter media construction which may be repeatedly used is shown in U.S. Pat. No. 4,242,205.

In order that the filter maintain effective filtration of both the filter media arrangements as generally disclosed by the above identified patents means are provided for maintaining the lateral edges sealed against the wall to prevent flow of the liquid suspension therealong.

SUMMARY OF THE INVENTION

In accordance with the present invention it is proposed to provide a new and improved filter media arrangement which is capable of repeated use.

This is accomplished generally by providing laterally spaced conveying means for attaching the marginal edges along the outer surface thereof so that the conveyor means serves to displace the media and to hold the latter in sealing engagement with the filter box.

In one embodiment of the invention the conveyor means includes laterally spaced outer drive chains and inner hold down chains fixed for movement with and adjacent to the outer drive chains. The outer drive chain have fastening means located on the outer face to which the marginal edge portion of the filter media are attached.

In a second embodiment the conveyor means includes laterally spaced drive chains which overlie the marginal edges of the filter media and have fastening means along the outer faces to which the media is attached.

BRIEF DESCRIPTION OF THE DRAWINGS

FIG. 1 is a side elevational view with parts broken away of a filter apparatus emboding the present invention.

FIG. 1a is a fragmentary elevation view of a modified filter belt loop arrangement.

FIG. 2 is a cross sectional view of the filter apparatus of FIG. 1, taken generally along line 2—2.

FIG. 3 is an enlarged and fragmentary cross-sectional view of the filter apparatus of FIG. 2.

FIG. 4 is a fragmentary top plan view of the device of FIG. 3, taken along line 4—4.

FIG. 5 is a enlarged fragmentary elevation view partially in cross section showing the manner in which the filter media is attached to the conveyor.

FIG. 6 is a side elevational view of a second embodiment of filter apparatus of the present invention.

FIG. 6a is a fragmentary elevation view of a modified filter media loop arrangement.

FIG. 7 is a cross sectional view taken generally along the lines 6—6 of FIG. 6.

FIG. 8 is an enlarged and fragmentary cross-sectional view of the filter apparatus of FIG. 7.

FIG. 9 is a fragmentary top plan view of the device of FIG. 8, taken along line 9—9.

FIG. 10 is an enlarged and fragmentary cross-sectional view showing the manner in which the filter media is attached to the conveyor.

Referring now to the drawings, in particular FIGS. 1, 1a, 2, 3, 4 and 5 there is shown a filter apparatus 10 including a tank 11 defining a chamber 12 in which a liquid suspension is introduced through an inlet opening 13 formed in the tank side wall. The tank 11 is supported on a frame 15 so as to be elevated above ground level. The lower portion of the tank 11 is provided with a filtrate or clean liquid box or chamber 14 having an outlet 16 connected to a pump P.

As shown a top or perforate wall 18 of the filtrate box 14 is perforate to provide fluid communication with the chamber 12. Overlying the perforate plate 18 is a horizontal run 19 of a filter media 20. The filter media 20 is intermittently or periodically displaced lengthwise along the length of the perforate wall 18 when the thickness of the layer of suspended solid deposited thereon is of a depth resulting in decreased filtration efficiency. The clean liquid or filtrate in the chamber 14 is recycled back to the system from which it originated for re-use. Filtration equipment of the type generally described above is employed in industrial applications, as for example, metal machining operations such as grinding, boring, turning and the like where the liquid is used as a coolant for the tooling. The scrap metal becomes suspended in the coolant and it is this liquid suspension that is filtered. For a more detailed description of the filter apparatus and its operation reference is made to the aforementioned U.S. Pat. No. 3,087,620.

In the embodiment of the invention as shown in FIGS. 1 and 5 the filter media 20, which maybe made from fabric either natural or synthetic, is in the form of an endless or closed loop belt 20. The synthetic material maybe woven monofilament fibers.

The belt 20 is displaced or indexed by means of a conveyor means 22 which is actuated by a power drive 24 to move the belt 20 an incremental distance and provide a filter area free of suspended solid so that the overall efficiency of the filter media overlying the perforate wall 18 of the filtrate chamber 14 is maintained. The power drive 24 and conveyor means 22 may be actuated at selected fixed time intervals or periodically when the pressure differential between the chamber 12 and filtrate chamber 14 is increased to a predetermined value. As more fully described in the aforementioned U.S. Pat. No. 3,087,620, a vacuum may be applied to the filtrate chamber to enhance the filtration efficiency. It is to be understood, however, that the pressure differential other than a vacuum on the opposite sides of the filter media 20 may be used to improve the efficiency, as for example by maintaining a liquid head differential between the inlet 13 and the outlet 16.

In the embodiment shown in FIGS. 1 to 5 inclusive the conveyor means 22 comprises a pair of laterally spaced outer drive chains 25—25 which are driven by a sprocket or gear drive 50 connected to the power drive 24 which includes a motor and speed reducer (not shown). The drive chains 25—25 may each be of the well known roller chain riveted type including as shown in FIG. 3, roller link plates 26, bushings 27, pin link plates 28 and rivets 29. Extending across the chains 25—25 and overlying the filter media 20 are a plurality of lengthwise spaced flights 30 which may be in the form of bars. As shown in FIGS. 3 and 4 the flights or bars 30 are fastened at the opposite ends thereof as by welding to the inner pin link plates 28. The lower edge of each of the flights is preferable located in close proximity to the filter media belt 20 to retain the latter in contact with the underlying perforate plate 18 of the filtrate box 14.

Located inwardly of the drive chains 25—25 are laterally spaced hold down chains 31—31 which may be of the same general structure as the drive chains 25—25 including pin link plates 32, roller link plates 33, bushing 34 and rivets 35.

Right angular clips 36 fixed at one leg 37 to the hold down chain 31 by the chain pins or rivets 35 and fastened to the flight 30 at other leg 38 by a rivet 39 or the like serves to fasten the hold chain to the flights 30 and thereby for movement with the drive chains 25—25.

As shown, the holddown chain 31 is accommodated within cut-outs 40 provided in the flights 30 to permit limited relative vertical movement of the chain links. It is to be noted that the hold down chain 31 overlies the opposite marginal edge portions of the filter media belt 20 to hold the latter in sealing relationship with the underlying top wall or plate 18 of the filtrate box 14 so that the flow of the liquid is restricted through the filter media into the filtrate box 14 and thereby to maintain the efficiency of the apparatus.

As shown in FIGS. 4 and 5, the outer terminal edge portions 42 of the filter media 20 extends outwardly of the hold down chains 31 and are folded along the outer face thereof so that grommet reinforced openings 41 spaced along the edges are in alignment with the attachment plates 44 provided on lengthwise spaced pin link plates 32. Nut and bolt assemblies 45 fasten the edge of the filter media belt 20 to the hold down chain 31.

The marginal edge portion of the belt 20 underlying the hold down chains 31 and projecting therebeyond may be coated with a friction reducing material such as a plastic material, as for example, Teflon marketed and sold by E. I. duPont de Nemours & Company of Wilmington, Del. or the like to improve its sealing and wear characteristics.

As shown in FIG. 1 the conveyor means 22 and the filter media 20 follow an identical closed loop path. The conveyor means 20 as heretofore described is operated by drive sprocket gear 50 which meshes with drive chain 25. The drive gear 50 may be located at the upper end of an inclined surface 43 from which the suspended solids deposited on the filter media during filtering are discharged into a suitable discharge bin 54. The conveyor means 22 and the filter media 20 extend from the gear downwardly along the exterior of the tank 11 for engagement about idler rollers 58 and horizontally therefrom along the base of the tank about second idler rollers 59. The filter media 20 and conveyor 22 thereafter extend upwardly for engagement about idler roller 61 located along the upper edge of the tank and then downwardly inwardly of another idler 69 located at the forward edge of the top perforate wall 18 of the filtrate box 14.

An idler 71 and the idler 69 serve to maintain the conveyor means in close proximity of the filtration box top wall 18 so that the weight of the hold down chain 31 is operative to retain the marginal edges of filter media 20 sealed against the wall 18.

Disposed on the outer downwardly inclined side of the filter media 20 may be an array of pneumatic blow down devices 72 which are operative when actuated to separate any of the cake of suspended solids which may not have been separated from the filter media 20. Such separated suspended solids may drop into the collection bin 54.

In operation, liquid suspension such as coolant from a plurality of metal working machines is introduced into the tank 11 for filtering through the filter media belt 20 overlying the perforate plate 16 of the filtrate chamber.

The suspended solids such as metal grindings, metal chips, or the like is deposited on the filter media as a layer which the liquid flows into the filtrate chamber 14. The clean liquid is pumped out of the chamber for reuse. As more fully described in the aforementioned U.S. Pat. No. 3,087,620 the pump P may be operated to withdraw liquid from the filtrate box creating a vacuum therein and causing a rapid flow of liquid through the media and thereby enhancing the efficiency of the apparatus. The suspended solids form a cake on the filter media thereby increasing the pressure differential between chamber 12 and filtrate box 14. When this pressure differential reaches a predetermined level, a pressure sensing device (not shown) is activated to relieve entirely the pressure differential. The drive conveyor motor is then activated to advance for a timed interval the conveyor chains. The conveyor means 22 including the drive chains 25—25 are moved to the right at a preselected distance as view in FIG. 1 whereby the left bottom hold down chains 31—31 fixed to flights 30 and connected to drive chains 25—25 are displaced a corresponding distance. The filter media is also moved the same distance because of its connection to the hold down chains 31 along the outer marginal edges by the fastening means 45. The layer of suspended solid deposited on the filter media is carried upwardly along the inclined surface 43 and over the power drive gear 50. The layer of suspended solid thereupon separates from the belt 20 and drops into the bin 54. At the same time the underside of the belt 20 may be cleansed to remove any residual cake therefrom by the application of the pneumatic pressure blow down devices 72 located on the exterior underside of the filter media 20.

As shown in FIG. 1a a plurality of liquid blow down devices 76 may be provided adjacent the opposite or front end of the tank 11. When such blow down devices 76 are employed the path of the conveyor means and filter media belt is modified as shown in FIG. 1a. The upward extension includes a general horizontal disposed U-shaped section formed by guiding the conveyor means over suitably located idler rollers 63, 73 and 74. The U-shaped section projects over the tank 11 and the blow down devices 76 are located so that the layer or residue of suspended solid is blown into the tank 11.

Referring now to FIGS. 6 to 10 there is illustrated another embodiment of filter apparatus wherein like parts are designated alike. The apparatus 100 includes a tank 11 supported on a frame 15. A filtrate or clean liquid chamber 14 is formed along the base of the tank 11 and includes a perforate top wall 18 through which the clarified liquid flows after passage through a filter media 20. The filter media 20 is periodically displaced incrementally along the length of the perforate wall 18 by means of a conveyor means 102.

A filter media 20 is in the form an endless band or belt and maybe made from the same material as that heretofore described.

The conveyor means 102 includes a pair of laterally spaced drive chains 104—104 each including pin link plates 106, roller link plates 108, rivets 110 and bushings 112. Selectively lengthwise spaced ones of the outer pin link plates 106 may be provided with attachment flanges 114 for accommodating a fastening means 116 such as a bolt, rivet or the like.

The drive chains 104—104 are arranged to provide a horizontal run overlying the perforate plate 18 and slidable thereon. The chains 104—104 are each then trained about idlers 71 and inclined upwardly on an inclined surface discharge ramp 43 to the upper and of which there is fixed idlers 118. The chains 104—104 travel about idlers 118 along the exterior of the discharge ramp to idlers 120 and along the exterior of the base and about idlers 122. The chains 104 extend upwardly along the forward end of the tank 11 to the top thereof and then are trained about idlers 124 downwardly toward the horizontally aligned idlers 126 to guide the chains for engagement along the opposite edges of the media 20 lying on the perforate plate 18 of the clean or clarified liquid compartment 14.

The forward end of the drive chain arrangement may be provided with horizontally disposed U-shaped loop extension as shown in FIG. 6a. The chains 104—104 may be trained about the idlers 128 and idlers 130 which are supported inwardly of the front end of the tank 11 to provide a parallel lower run which is vertically spaced from the upper run. The chains 104—104 then continue downwardly about idlers 131 along the inner front edge of the tank 11 and about the idlers 126 as heretofore explained.

Lengthwise spaced flights 30 in the form of plates or bars are fixed at the opposite ends thereof as by welding to opposing ones of the link plates 106. The flights 30 overly the filter media 20 and retain it in close proximity to the perforate wall 18. As shown in FIGS. 7-10 the chains overlies the marginal edge portions of the filter media 20 to retain it in substantial sealing engagement with the plate 18. The outer marginal edge portions extend outwardly beyond the chains 104 and are provide with grommet reinforced openings 132 which receive screws, rivets or other suitable fastening means 120 for attaching the media 20 to the projecting attachment flanges 14 on the outer faces of the pin link plates 106 as shown in FIG. 10. The filter media belt 20 is thus attached to the drive chain 102 movement therewith.

The conveyor means 102 is actuated as shown in FIG. 5 by a drive motor 134, speed reducer 136 which drives a gear 138 which meshes with a closed loop roller chain 140 which is trained over idler gear 142. Extending from the chains 140 are a plurality of driving lugs 140 which mesh with the link chain 104 to drive the latter.

Upon actuation of the drive chain 104 the flights 30 and the filter media belt 20 are simultaneously displaced an incremental distance as heretofore described in connection with the embodiment of the invention disclosed in FIGS. 1–5. Upon movement of the filter media 20 the layer of filtered suspended matter may break away from the filter media and drop into the waste bin 54. An array of pneumatic blow-off devices 145 may also be used adjacent the receptable to assist in the separation of the layer of suspended matter from the filter media.

In the event that the conveyor and filter media support arrangement as shown in FIG. 6a is used, liquid blow-off means 148 may be used to dislodge or separate the layer or any residual suspended solid from the lower run of the horizontally disposed U-shaped arrangement. The separated suspended solid will drop into the tank 11 wherein it is separated from the liquid by the filter media 20.

In other respects the operation of the embodiment of FIGS. 6-10 is generally similar to that described in connection with the embodiment of FIGS. 1-5.

What is claimed is:

1. A filter apparatus for removing suspended solids from a liquid suspension, said apparatus comprising
   (a) a tank including a base and upstanding end and side walls defining a chamber in which said liquid suspension is received;
   (b) a filtrate chamber in said tank;
   (c) said filtrate chamber including a perforate wall through which the liquid filtrate flows into said filtrate chamber;
   (d) an endless flexible media having laterally spaced and longitudinal extending edges, said filter media being mounted on said tank so that a length thereof overlies said perforate wall and another length is disposed exterior of said tank;
   (e) endless conveyor means mounted on said tank and located so as to provide a path of travel similar to the path of said filter media;
   (f) said conveyor means including a holddown chain having a run overlying a marginal edge portion adjacent each of said longitudinal edges of said filter media to maintain a first inboard marginal edge portion of said filter media in contact with said perforate wall and a conveyor chain located outboard of a second marginal edge portion outboard of said first marginal edge portion;
   (g) means fixing said outboard second marginal edge portion of said filter media to the outboard face of said holddown chain for movement therewith; and
   (h) drive means for driving said conveyor means.

2. The filter apparatus as defined in claim 1 wherein said drive means comprises (a) a driving gear and a lengthwise spaced idler gear,
(b) a roller chain trained over said driving gear and said idler gear,
(c) said roller chain having a plurality of lengthwise lugs engageable with said conveyor chain for driving said conveyor and thereby moving said filter media fixed to said holddown chain.

* * * * *